United States Patent
Kato et al.

(10) Patent No.: US 8,043,421 B2
(45) Date of Patent: *Oct. 25, 2011

(54) DURABLE AUTOMOTIVE WINDSHIELD COATING AND THE USE THEREOF

(75) Inventors: Masahiro Kato, Utsunomiya (JP); Akinori Tanaka, Osaka (JP); Masahiro Sasagawa, Osaka (JP); Hiromitsu Adachi, Osaka (JP)

(73) Assignees: E.I. du Pont de Nemours & Company, Wilmington, DE (US); Soft 99 Corporation, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/919,234

(22) PCT Filed: Mar. 12, 2008

(86) PCT No.: PCT/US2008/003313
§ 371 (c)(1),
(2), (4) Date: Aug. 25, 2010

(87) PCT Pub. No.: WO2009/113978
PCT Pub. Date: Sep. 17, 2009

(65) Prior Publication Data
US 2011/0000816 A1    Jan. 6, 2011

(51) Int. Cl.
*C09K 3/18* (2006.01)
(52) U.S. Cl. .............................................. 106/2; 528/42
(58) Field of Classification Search ......... 106/2; 528/42
See application file for complete search history.

(56) References Cited

U.S. PATENT DOCUMENTS

| | | | |
|---|---|---|---|
| 5,328,768 A * | 7/1994 | Goodwin | 428/428 |
| 5,523,161 A * | 6/1996 | Goodwin | 428/421 |
| 5,523,162 A * | 6/1996 | Franz et al. | 428/421 |
| 5,674,967 A * | 10/1997 | Goodwin | 528/42 |
| 5,688,864 A * | 11/1997 | Goodwin | 524/858 |
| 5,707,740 A * | 1/1998 | Goodwin | 428/410 |
| 5,980,990 A * | 11/1999 | Goodwin | 427/309 |
| 6,025,025 A * | 2/2000 | Bartrug et al. | 427/302 |
| 6,613,860 B1 * | 9/2003 | Dams et al. | 528/36 |
| 6,776,834 B2 * | 8/2004 | Sirejacob | 106/287.1 |
| 6,811,884 B2 * | 11/2004 | Goodwin et al. | 428/447 |
| 7,097,910 B2 * | 8/2006 | Moore et al. | 428/447 |
| 2010/0310881 A1 * | 12/2010 | Kato | 428/422 |

* cited by examiner

*Primary Examiner* — Anthony Green
(74) *Attorney, Agent, or Firm* — Potter Anderson & Corroon LLP; Hilmar L. Fricke, Esq.

(57) ABSTRACT

The present invention is directed to a kit for rendering a glass surface water repellent. This invention is particularly directed to a kit for coating a windshield of a vehicle to render the windshield water repellent.

8 Claims, 3 Drawing Sheets

DURABLE AUTOMOTIVE WINDSHIELD COATING AND THE USE THEREOF

FIELD OF INVENTION

The present invention is directed to a kit for rendering a glass surface water repellent. This invention is particularly directed to a kit for coating a windshield of a vehicle to render the windshield water repellent.

BACKGROUND OF INVENTION

Coating compositions comprising perfluorocarbonsilane, such as perfluoroalkylalkyl silane, perfluoroalkylalkyl trichlorosilane can be used to treat a glass surface, such as the surface of a windshield of a vehicle or windows, to render it water repellent.

The perfluoroalkylalkylsilane or perfluoroalkylalkyltrichlorosilane based water repellents provide good water repellency on glass surfaces due to the high reactivity between the silane and the hydroxyl groups on the glass surface. However, they have limited durability and resistance to weathering and abrasion. They are also sensitive to trace amount of water during production and storage. Examples of perfluoroalkylalkyl silane or perfluoroalkylalkyl trichlorosilane based water repellents are disclosed in U.S. Pat. Nos. 5,523,162, and 5,523,161. To overcome the water sensitivity and to impart resistance to weathering and abrasion, additional components, such as hydrolysable silanes that are capable of hydrolysis to silica gel, are required in the perfluoroalkylalkylsilane or perfluoroalkylalkyltrichlorosilane based water repellents as described in the aforementioned U.S. Pat. No. 5,523,161. In addition, water drops on the surface treated with those silanes are not readily sliding off.

It is therefore still needed for a water repellent that is easy to produce and store, having good durability and improved water sliding property.

STATEMENT OF INVENTION

This invention is directed to a kit for rendering a surface of a substrate water repellent, said kit comprising:
(A) a coating composition consisting essentially of:
 a) at least one perfluoroalkyltrichlorosilane selected from compounds having the general formula

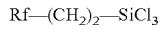

Rf—(CH$_2$)$_2$—SiCl$_3$ wherein, Rf is a perfluoroalkyl radical group having 3 through 18 alkyl carbon atoms;
 b) a perfluoropolyether carboxylic acid; and
 c) at least one fluorinated solvent;
(B) optionally, an applicator for applying said coating composition over said surface;
(C) optionally, instructions on applying said coating composition over said surface using said applicator; and
(D) optionally, one or more cleaning agents for cleaning said surface.

DETAILED DESCRIPTION

Figure 1A:
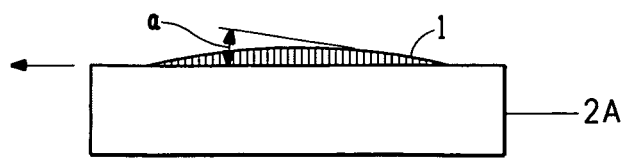
FIG. 1 shows schematic presentations of contact angles. (A) and (B): Typical water contact angles for a hydrophilic surface. The contact angles alpha (α) are typically between 0° and 30°. (C) and (D): Typical water contact angles for a hydrophobic surface. The contact angles alpha (α) are typically between 90° and 180°.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "substrate" refers to an article that is to be coated by a coating composition. The substrate can be transparent or non-transparent. A transparent substrate can be made from glass, polymeric materials such as plastic, or a combination thereof. Examples of the substrate can include glass or plastic windows, such as the interior or exterior windows for buildings; eye glasses; windshield of a vehicle (including motorcycle); windshield of water crafts or air crafts; glass covers of devices and equipments, such as watches, swimming goggles; wind covers for helmets, such as motorcycle helmets; glass lenses, such as telescope lenses or camera lenses; transparent separation devices, such as glass safety screens, or splash protection barriers; and glass doors or windows for equipments or instruments, such as chemical reaction hoods, biological or medical hoods, incubators, cabinets, microwave ovens, toaster ovens, or refrigerators.

The term "vehicle", "automotive", "automobile", "automotive vehicle", or "automobile vehicle" refers to a vehicle such as car, van, mini van, bus, SUV (sports utility vehicle); truck; semi truck; train; tram; tractor; motorcycle; trailer; ATV (all terrain vehicle); pickup truck; heavy duty mover, such as, bulldozer, mobile crane and earth mover; airplanes; boats; ships; and other modes of transport.

The term "windshield" of a vehicle means the front glass of a vehicle, typically made from glass, reinforced or laminated glass. A windshield can be fixed onto the vehicle. A windshield can also be removable or detachable from the vehicle. The windshield typically can be made of glass, polymeric materials such as plastics, or polymeric materials reinforced or laminated glass. A typical windshield of a car can have two or more sheets of glass with a layer of plastic laminated in between. Other windows of a vehicle, such as side windows or rear windows, can also be substrates for the coating composition of this invention. For a good see-through visibility, a windshield of a vehicle needs to be water repellent so rain drops, water splashes, small debris, or dirt are not stick to the windshield.

A surface of a substrate, such as a windshield, can be treated with fluorosilane, such as perfluoroalkylalkylsilane or perfluoroalkylalkyltrichlorosilane to become water repellent. The trichlorosilane groups are very reactive with the hydroxyl groups on the surface of substrates, such as glass substrates, and therefore providing good treatment efficiency.

Figure 1B:
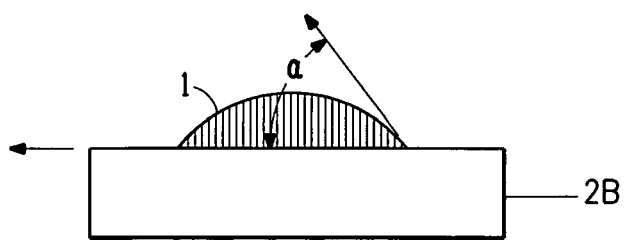
Figure 1C:
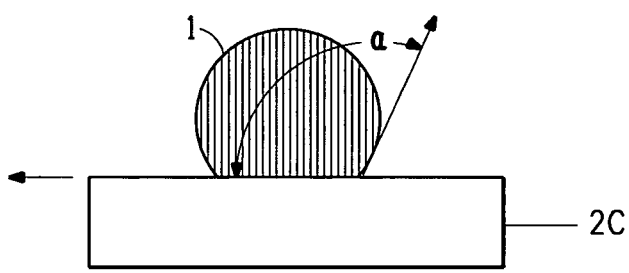
Figure 1D:
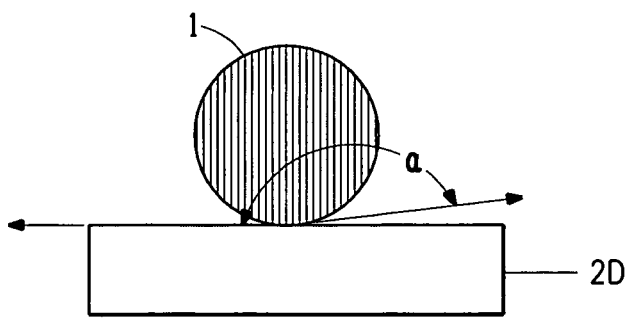
Figure 2A:
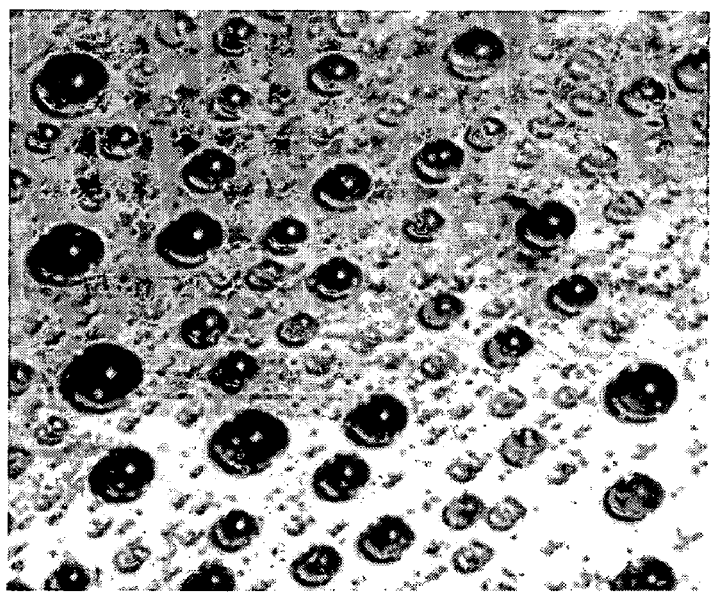
FIG. 2 shows representative images of water drops on glass surfaces treated with the coating compositions. (A) and (C): Glass surface treated with a representative example of the coating composition of this invention. (B) and (D): Glass surface treated with a representative comparative coating composition. (A) and (B) show the initial water drop formation. (C) and (D) show water drop formation after 600 strokes of abrasion tests.
Figure 2B:
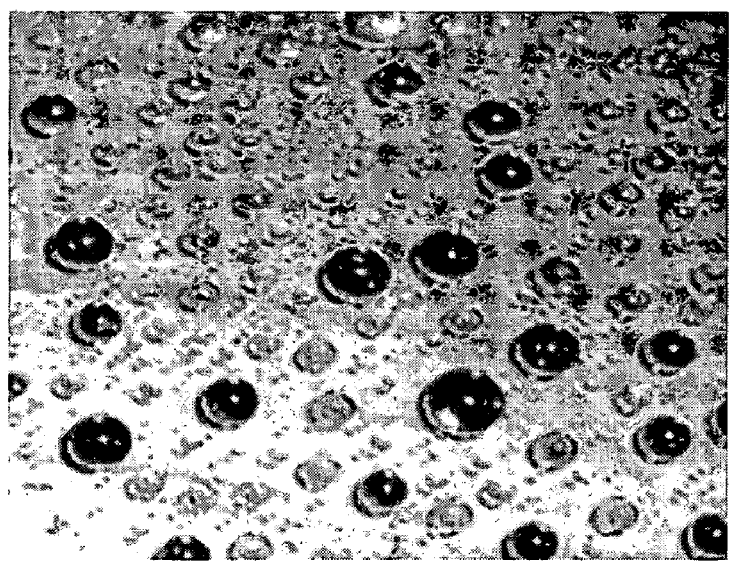
Figure 2C:
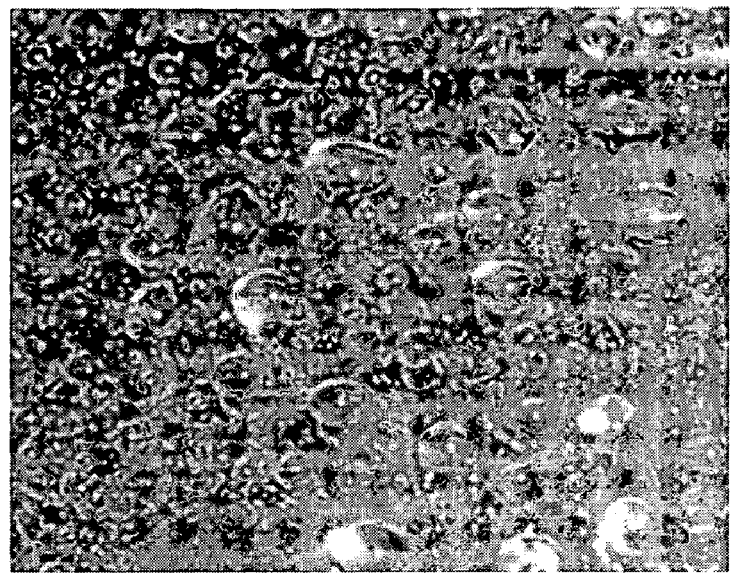
Figure 2D:
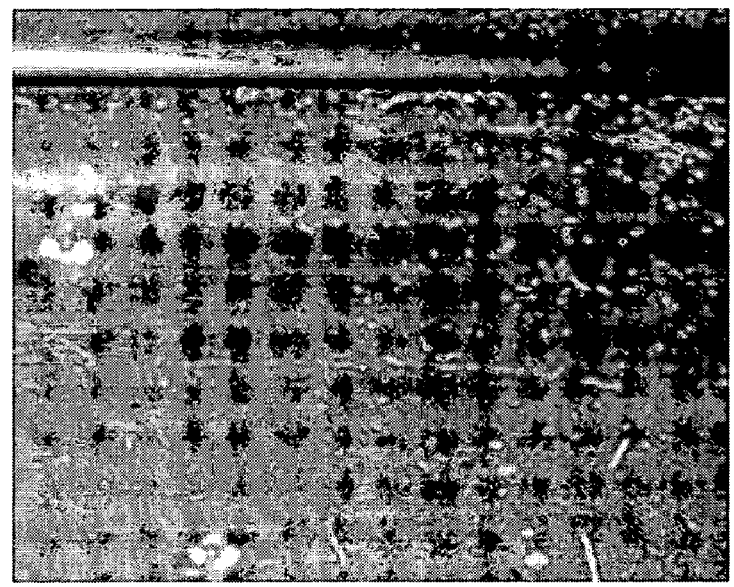

When a water drop (1) contacts a strong hydrophilic solid surface (2A), the water drop spreads on the surface. The contact angle alpha (α) can be close to 0° (FIG. 1A). For a less hydrophilic surface (2B), the contact angle can be in a range of from close to 0° to up to 30° (FIG. 1B). For a hydrophobic solid surface (2C and 2D), such as a glass surface treated with a water repellent, the contact angle can be greater than 90°, in a range from 90° to close to 180° (FIGS. 1C and 1D). For a highly hydrophobic surface (2D), water drop may simply rest on the surface without actually wetting the surface (FIG. 1D), a so called Lotus effect.

For a surface treated with a water repellent, the contact angle can be reduced once the water repellent is wearing off due to weathering or abrasion. Durability of a water repellent that is applied to a surface can be measured by measuring the contact angles before and after weathering or abrasion.

The contact angles can be measured by the sessile drop test commonly used in the industry. In brief, a drop of water is placed on the surface to be measured in front of a lighting source. The profile of the sessile drop is viewed and the contact angle alpha (α) is measured using a goniometer.

This invention is directed to a coating composition for coating a substrate. The coating composition, when applied over the surface of the substrate, can render the surface water repellent. The coating composition can comprise:
a) at least one perfluoroalkyltrichlorosilane selected from compounds having the general formula

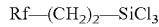

wherein, Rf is a perfluoroalkyl radical group having 3 through 18 alkyl carbon atoms;
b) a perfluoropolyether carboxylic acid; and
c) at least one fluorinated solvent.

The coating composition of this invention can consist essentially of:
a) at least one perfluoroalkyltrichlorosilane selected from compounds having the general formula

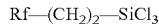

wherein, Rf is a perfluoroalkyl radical group having 3 through 18 alkyl carbon atoms;
b) a perfluoropolyether carboxylic acid; and
c) at least one fluorinated solvent.

The perfluoroalkyl radical group can be linear or branched alkyl groups. Linear alkyl radical groups are preferred.

Examples of suitable perfluoroalkyltrichlorosilanes include perfluoropropylethyltrichlorosilane, perfluorobutylethyltrichlorosilane, perfluoropentylethyltrichlorosilane, perfluorohexylethyltrichlorosilane, perfluoroheptylethyltrichlorosilane, perfluorooctylethyltrichlorosilane, perfluorononylethyltrichlorosilane, perfluorodecylethyltrichlorosilane, perfluoroundecylethyltrichlorosilane, perfluorododecylethyltrichlorosilane, perfluorotridecylethyltrichlorosilane, perfluorotetradecylethyltrichlorosilane, perfluoropentadecylethyltrichlorosilane, perfluorohexadecylethyltrichlorosilane, perfluoroheptadecylethyltrichlorosilane, perfluorooctadecylethyltrichlorosilane, or a combination thereof.

In one example, the coating composition of this invention can have the Rf selected from perfluoroalkyl radical groups having the general formula:

wherein n is an integer number from 6 through 16. Examples of suitable perfluoroalkyltrichlorosilanes having this general formula include perfluorohexylethyltrichlorosilane, perfluoroheptylethyltrichlorosilane, perfluorooctylethyltrichlorosilane, perfluorononylethyltrichlorosilane, perfluorodecylethyltrichlorosilane, perfluoroundecylethyltrichlorosilane, perfluorododecylethyltrichlorosilane, perfluorotridecylethyltrichlorosilane, perfluorotetradecylethyltrichlorosilane, perfluoropentadecylethyltrichlorosilane, perfluorohexadecylethyltrichlorosilane, or a combination thereof.

In another example, the costing composition of this invention comprises:
a) one or more perfluoroalkyltrichlorosilanes selected from the group consisting of perfluorohexylethyltrichlorosilane, perfluorooctylethyltrichlorosilane, perfluorodecylethyltrichlorosilane, perfluorododecylethyltrichlorosilane, perfluorotetradecylethyltrichlorosilane, and a combination thereof;
b) a perfluoropolyether carboxylic acid; and
c) at least one fluorinated solvent.

In yet another example, the coating composition of this invention consists essentially of:
a) one or more perfluoroalkyltrichlorosilane selected from the group consisting of perfluorohexylethyltrichlorosilane, perfluorooctylethyltrichlorosilane, perfluorodecylethyltrichlorosilane, perfluorododecylethyltrichlorosilane, perfluorotetradecylethyltrichlorosilane, and a combination thereof;
b) a perfluoropolyether carboxylic acid; and
c) at least one fluorinated solvent.

In yet another example, the coating composition of this invention consists essentially of:
a) 0.1% to 10% weight percentage, preferably 0.1% to 5%, even preferably 0.5% to 2% of the perfluoroalkyltrichlorosilane;
b) 0.1% to 10% weight percentage, preferably 0.1% to 5%, even preferably 0.2% to 2% of the perfluoropolyether carboxylic acid; and
c) 80% to 99.8% weight percentage of the at least one fluorinated solvent;
wherein all percentages are based on total weight of the coating composition.

The coating composition can have additional components, such as fragrant materials or pigments as non-essential components. Commonly known fragrant materials can be mixed with the coating composition to provide a pleasant smell. Pigments, such as $TiO_2$ pigments, can be added to provide color or shade to a glass window such as a building's window, a side window or a rear window of a vehicle.

Perfluoroalkyltrichlorosilane and its derivatives are known to provide good water repellency on glass surfaces, however with sensitivity to tract amount of water during production or storage, and less durability for resisting weathering and abrasion as described in prior art, such as the aforementioned U.S. Pat. No. 5,523,161. The applicant unexpectedly discovered that by using a combination of perfluoropolyether carboxylic acid and fluorinated solvent, the coating composition of this invention provides good water repellency and improved durability. With the combination, the coating composition of this invention does not need hydrolysable silane that is required by priori arts. The coating composition of this invention is easy to produce and stable to store. It is also easy to apply onto substrates without the needs for pre-treatment such as primed with a silicon layer described in the aforementioned U.S. Pat. No. 5,523,161. The applicant also discovered that by treating the surface with the coating composition of this invention, water sliding property of the surface is improved so water drops can easily slide off the treated surface. The improved water sliding property can be measured as reduced sliding angles. This is an important property since it enables water drops to run off the substrate and improves see-through visibility of substrates such as the windshield of a vehicle.

This invention is also directed to a process for rendering a surface of a substrate water repellent. The process of this invention comprises the steps of applying a coating composition over the surface of the substrate to form a layer of said coating composition thereon, wherein said coating composition consists essentially of: a) at least one perfluoroalkyltrichlorosilane selected from compounds having the general formula Rf—(CH$_2$)$_2$—SiCl$_3$, wherein, Rf is a perfluoroalkyl radical group having 3 through 18 alkyl carbon atoms; b) a perfluoropolyether carboxylic acid; and c) at least one fluorinated solvent.

In one example, the coating composition for the process of this invention can have the Rf selected from perfluoroalkyl radical groups having the general formula:

$$F(CF_2)_n$$

Wherein, n is an integer from 6 through 16.

In another example, the coating composition for the process of this invention comprises:
a) one or more perfluoroalkyltrichlorosilane selected from the group consisting of perfluorohexylethyltrichlorosilane, perfluorooctylethyltrichlorosilane, perfluorodecylethyltrichlorosilane, perfluorododecylethyltrichlorosilane, perfluorotetradecylethyltrichlorosilane, and a combination thereof;
b) a perfluoropolyether carboxylic acid; and
c) at least one fluorinated solvent.

In yet another example, the coating composition for the process of this invention consists essentially of:
a) one or more perfluoroalkyltrichlorosilane selected from the group consisting of perfluorohexylethyltrichlorosilane, perfluorooctylethyltrichlorosilane, perfluorodecylethyltrichlorosilane, perfluorododecylethyltrichlorosilane, perfluorotetradecylethyltrichlorosilane, and a combination thereof;
b) a perfluoropolyether carboxylic acid; and
c) at least one fluorinated solvent.

In yet another example, the coating composition for the process of this invention consists essentially of:
a) 0.1% to 10% weight percentage, preferably 0.1% to 5%, even preferably 0.5% to 2% of the perfluoroalkyltrichlorosilane;
b) 0.1% to 10% weight percentage, preferably 0.1% to 5%, even preferably 0.2% to 2% of the perfluoropolyether carboxylic acid; and
c) 80% to 99.8% weight percentage of the at least one fluorinated solvent;
wherein all percentages are based on total weight of the coating composition.

Most commercially available fluorinated solvents, such as fluorinated hydrocarbon solvents or perfluorinated organic solvents such as perfluorocarbons, or a combination thereof, can be suitable for this invention. Examples of commercial fluorinated solvents can include ethoxy-nonafluorobutane available form 3M as HFE-7200, perfluorocarbon solvents such as fully fluorinated liquid FC-40 available also from 3M, or a combination thereof.

The coating composition of this invention can be applied over a surface of a substrate by wiping with a sponge. Small amount of the coating composition can be poured onto the surface to be coated, or soaked into a sponge. The sponge can be used to wipe the coating composition over the surface to form a thin layer of the coating composition thereon. Excess amount of the coating composition can be wiped off with a piece of cloth. The coated surface can be air dried for a few minutes if desired.

The coating composition of this invention can be packaged into a kit. The kit can comprise the coating composition of this invention packaged in a sealed container. The kit can further comprise an applicator for applying said coating composition over said surface; and optionally, instructions on applying said coating composition over said surface using said applicator.

The applicator of the kit can be one or more pieces of sponge or a squeegee. The kit can further include one or more pieces of cloth for wiping off excess amount of the coating composition.

The kit can have a flexible container and a piece of sponge packaged together, wherein said sponge is affixed to the flexible container. The coating composition can be dispensed directly from the flexible container to the sponge by squeezing the flexible container. The container can be used as a handle to move the sponge to coat the surface while the coating composition can be dispensed from the container to the sponge.

The kit can further include instructions on how to use the coating composition, how to apply the coating composition over a substrate. The instructions can also include material safety data sheets and other directions and warnings for proper handling of the coating composition or the kit.

The substrate can be cleaned or polished before application of the coating composition. Commonly used water, detergents, solvents, or a combination thereof can be used to clean the substrate. For glass surfaces, a glass polishing compound such as cerium oxide can be used to polish the surface. Polishing can be performed manually or by using a polishing tool known to those skilled in the art. Polished surface can be further cleaned before the application of the coating composition.

The coating composition can also be applied to a glass substrate at an elevated temperature, such as in a range of from 35° C. to 100° C. Elevated temperature can increase the bounding between the silane in the coating composition and the glass substrate.

With appropriate equipment, such as an evaporation chamber, the coating composition can also be evaporated onto a substrate to form a thin layer thereon.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Testing Procedures

Contact Angle Measurement

The contact angles are measured by the sessile drop test commonly used in the industry. In brief, a drop of water is placed on the surface to be measured in front of a lighting source. The profile of the sessile drop is viewed and the contact angle alpha ($\alpha$) is measured using a goniometer. A commercial goniometer available from First Ten Angstroms, Portsmouth, Va., USA (Model: FT Å 125) can be used. Schematic diagrams on the contact angles $\alpha$ are shown in FIG. 1.

Sliding Angle Measurement

A water droplet is dropped on the surface of a substrate to be tested while the substrate is maintained horizontally. Then, the substrate is gradually inclined, whereby the angle (the sliding angle) between the horizontal plane and the substrate when the water droplet starts sliding, is measured. The smaller the sliding angle, the easier the water droplet slides off the surface of the substrate.

Abrasion Test

A glass polishing compound is applied over a treated water repellent surface. Then a sponge is used to repeatedly wipe the treated surface in a circular or a reciprocal traverse pattern. A pre-determined weight can be applied on top of the sponge during abrasion. The abrasion test can be performed manually or by using a device. A commercial device available from Yasuda-Seiki-Seisakusyo, Ltd., Japan (Model: No. 552 Gardner's Washerbility Tester) can be used.

Windshield Treatment

A standard vehicle glass windshield was used. The windshield was polished using sponge and Glaco-Baisoku-Compound available from available from Soft99, Chuo-ku, Osaka, Japan.

After polishing, the glass windshield was cleaned with water and placed at a horizontal position with the polished glass surface upwards. About 1 ml of a coating composition was applied onto the polished surface. A sponge was used to wipe and coat the surface with the solution within a desired area. After about 5 to 10 minutes, the coated area was wiped with a piece of cloth to remove excess amount of the coating composition.

The windshield surface was divided into two areas: a first area was coated with a comparative coating composition and a second area was coated with the coating composition of this invention. Both areas were treated with the same process described above.

Initial contact angles were measured after the surface was treated.

The coated areas were then subject to the abrasion tests as described in the "Testing Procedures". The weight applied to the sponge was 470 grams. The abrasion test was done in a reciprocal traverse pattern.

After pre-determine number of strokes, water contact angles were measured and recorded.

Comparative Coating Compositions

Comparative 1 and Comparative 2 were coating compositions comprising a mixture of perfluoroalkyltrichlorosilanes without perfluoropolyether carboxylic acid was used as another comparative coating composition.

Comparatives 3 and 4 were coating compositions comprising perfluoropolyether carboxylic acid, but without the aforementioned mixture of perfluoroalkyltrichlorosilane.

Formulations of the Comparatives 1 though 4 are shown in Table 1.

Comparative 5 was a commercial product available from Soft99 and sold under the commercial name Ultra Glaco.

Examples

Coating Compositions

A mixture of perfluoroalkyltrichlorosilanes, available as MPD-7653 from DuPont, Wilmington Del., USA, was used to formulate the coating composition of this invention. The mixture MPD-7653 contains perfluorohexylethyltrichlorosilane, perfluorooctylethyltrichlorosilane, perfluorodecylethyltrichlorosilane, perfluorododecylethyltrichlorosilane, and perfluorotetradecylethyltrichlorosilane as specified by the manufacturer.

Comparative coating compositions and Examples 1-6 were prepared by mixing the components according to Table 1

TABLE 1

| | Coating Compositions (All based on weight percentage of the total weight of the coating composition). | | | | |
|---|---|---|---|---|---|
| Samples | Mixture of perfluoroalkyltrichloro silanes (MPD-7653) | Perfluoropolyether carboxylic acid (Krytox ® 157FSL)* | Fluorinated solvent HFE-7200** | Fluorinated solvent FC-40** | Total |
| Comparative 1 | 1% | — | 99% | — | 100% |
| Comparative 2 | 1% | — | — | 99% | 100% |
| Comparative 3 | — | 1% | 99% | — | 100% |
| Comparative 4 | — | 1% | — | 99% | 100% |
| Example 1 | 1% | 0.2% | — | 98.8% | 100% |
| Example 2 | 1% | 0.5% | — | 98.5% | 100% |
| Example 3 | 1% | 1% | — | 98% | 100% |
| Example 4 | 1% | 2% | — | 97% | 100% |
| Example 5 | 1% | 1% | 98% | — | 100% |
| Example 6 | 1% | 1% | 50% | 48% | 100% |

*Krytox 157FSL is available from DuPont, Wilmington, DE, USA. Krytox ® is a registered trademark of DuPont.
**Both HFE-7200 and FC-40 are available from 3M, St. Paul, MN, USA. 3M ® is a registered trademark of 3M.

Coating Properties

The Comparative coating compositions and the coating compositions of Examples 1-6 were used to treat the glass windshield as described in "WINDSHIELD TREATMENT". Contact angles and sliding angles were measured and the results are shown in Table 2.

Initial contact angles for the comparatives 1-5 and Examples 1-6 were similar indicating good water repellency immediately after the application.

Sliding angles for the comparatives 1 and 2 were greater than 45° immediately after the application. Sliding angle for the Examples 1-6 were at about 30° immediately after the application indicating improved water sliding property.

Images of water drops on the windshield are shown in FIG. 2: (A) and (B) showing water drops forming on the windshield after treatment before abrasion test for both the comparative 5 coating composition and the Example 2; (C) showing water drops forming on the windshield coated with the Example 2 after 600 abrasion strokes indicating good water repellency; (D) showing water spreading on the windshield coated with the comparative 5 after 600 abrasion strokes indicating poor water repellency.

TABLE 2

Contact Angle and Sliding Angle Measurement Data.

| Samples | Sliding Angle | Initial Contact Angle | Contact Angle after 300 strokes | Contact Angle after 600 strokes |
|---|---|---|---|---|
| Comparative 1 | 49° | 108° | 98° | 88° |
| Comparative 2 | 46° | 108° | 101° | 88° |
| Comparative 3 | — | 35° | 11° | 10° |
| Comparative 4 | — | 40° | 12° | 11° |
| Comparative 5 | 35° | 105° | 68° | 32° |
| Example 1 | 33° | 107° | 100° | 88° |
| Example 2 | 30° | 107° | 101° | 88° |
| Example 3 | 30° | 107° | 100° | 84° |
| Example 4 | 30° | 106° | 96° | 76° |
| Example 5 | 32° | 107° | 96° | 72° |
| Example 6 | 30° | 107° | 98° | 80° |

What is claimed is:

1. A kit for rendering a surface of a substrate water repellent, said kit comprising:
   (A) a coating composition consisting essentially of:
   a) at least one perfluoroalkyltrichlorosilane selected from compounds having the general formula $Rf-(CH_2)_2-SiCl_3$ wherein, Rf is a perfluoroalkyl radical group having 3 through 18 alkyl carbon atoms;
   b) a perfluoropolyether carboxylic acid; and
   c) at least one fluorinated solvent.

2. The kit of claim 1 further comprising:
   (B) an applicator for applying said coating composition over said surface;
   (C) optionally, instructions on applying said coating composition over said surface using said applicator; and
   (D) optionally, one or more cleaning agents for cleaning said surface.

3. The kit of claim 1, wherein said coating composition consists essentially of:
   a) 0.1% to 10% weight percentage of the perfluoroalkyltrichlorosilane;
   b) 0.1% to 10% weight percentage of the perfluoropolyether carboxylic acid; and
   c) 80% to 99.8% weight percentage of the at least one fluorinated solvent;
   wherein all percentages are based on total weight of the coating composition.

4. The kit of claim 1, wherein Rf is selected from perfluoroalkyl radical groups having the general formula $F(CF_2)n$ Wherein n is an integer number from 6 through 16.

5. The kit of claim 4, wherein said perfluoroalkyltrichlorosilane is selected from the group consisting of perfluorohexylethyltrichlorosilane, perfluorooctylethyltrichlorosilane, perfluorodecylethyltrichlorosilane, perfluorododecylethyltrichlorosilane, perfluorotetradecylethyltrichlorosilane, and a combination thereof.

6. The kit of claim 1, 2, 3, 4, or 5, wherein said coating composition is packaged in a sealed container.

7. The kit of claim 6, wherein said container is a flexible container and wherein said coating composition is supplied to said substrate by squeezing said flexible container.

8. The kit of claim 1, 2, 3, 4, or 5, wherein said substrate is a windshield of a vehicle.

* * * * *

UNITED STATES PATENT AND TRADEMARK OFFICE
CERTIFICATE OF CORRECTION

| | |
|---|---|
| PATENT NO. | : 8,043,421 B2 |
| APPLICATION NO. | : 12/919234 |
| DATED | : October 25, 2011 |
| INVENTOR(S) | : Masahiro Kato et al. |

Page 1 of 1

It is certified that error appears in the above-identified patent and that said Letters Patent is hereby corrected as shown below:

On the Title Page, Item (73) Assignees are listed as E.I. du Pont de Nemours & Company and Soft 99 Corporation and should be listed as E.I. du Pont de Nemours and Company and Soft99 Corporation.

Signed and Sealed this
Tenth Day of April, 2012

David J. Kappos
*Director of the United States Patent and Trademark Office*